Jan. 31, 1928.

C. H. FENNELL 1,657,569

POLISHING DEVICE

Filed April 8, 1925

Inventor
Charles H. Fennell
By Jking Harness
Attorney

Patented Jan. 31, 1928.

1,657,569

UNITED STATES PATENT OFFICE.

CHARLES H. FENNELL, OF DETROIT, MICHIGAN.

POLISHING DEVICE.

Application filed April 8, 1925. Serial No. 21,491.

It is the primary object of my invention to provide a device for polishing metal surfaces or the like and particularly the interior surfaces of cylindrical passages. My device is particularly well adapted for use in polishing the interior surfaces of cylinder bores of internal combustion engines, and that is the use to which I have applied the invention in actual practice.

With the above and other objects in view, my invention consists in the arrangement, combination and construction of the various parts of my improved device, as described in the specification, claimed in my claims, and shown in the accompanying drawing, in which:

Figures 1, 2:
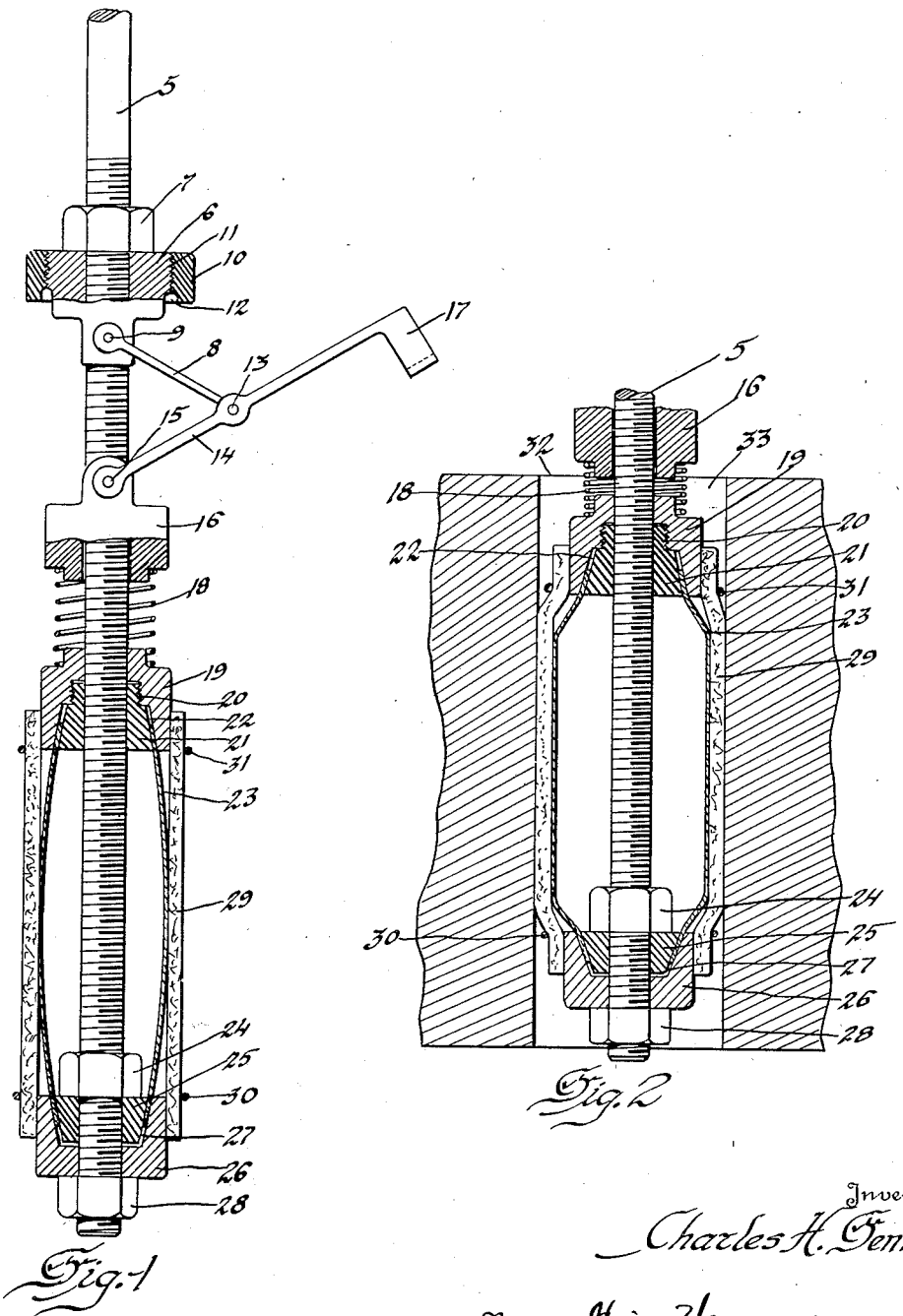
Fig. 1 is a vertical central sectional view of my improved device.
Fig. 2 is a similar view showing my improved device in operation.

I have shown a shaft 5 which may be suitably connected by a flexible shaft or any other suitable connecting means to a source of energy for rotating the same. Suitably held on the shaft 5 is a member 6 vertically adjustable by a nut 7 and having a toggle lever 8 pivoted thereto as at 9. Threaded on the periphery of the member 6 is a ring 10 having a cutaway portion on its bottom co-operating with a similar portion under the screw threads 11 of the member 6 to form a notch 12.

The outer end of the lever is pivoted as at 13 to a lever 14, one end of which is pivoted as at 15 to a member 16 which is slidable on the shaft 5. The lever 14 is provided with a curved end 17 adapted to engage in the groove 12 when the lever is moved on its pivot to bring the portion 17 thereof adjacent the groove.

Bearing against the under side of the member 16 and encircling the shaft 5 is a coil spring 18, the bottom end of which bears against a member 19 slidable on the shaft 5. The member 19 is interiorly apertured and is threaded as at 20, and a wedge 21 encircling the shaft 5 is provided with co-operating screw threads so that the two members may be joined together. A space 22 is provided between the members 19 and 21 on their lower ends, into which is inserted a plurality of flat springs 23 which are clamped between the inner periphery of the member 19 and the wedge shaped outer periphery of the member 21, when the two members are screwed together.

A nut 24 is provided on the shaft 5 adjacent the bottom end thereof and a wedge member 25 encircling the shaft 5 abuts the bottom of the nut. A member 26 encircles the shaft 5 below the wedge member 25, and is provided with a cut out portion on its upper face, into which the wedge member 25 passes, providing a space 27 between them. The member 26 is drawn up by a nut 28 on the bottom of the shaft 5 so as to clamp the lower ends of the spring strips 23 between the inner periphery of the cut out portion of the member 26 and the outer periphery of the wedge 25.

A tubular member 29 of felt, leather, or the like is slipped over the springs 23 and is held in place by a band 30 on the bottom thereof and a band 31 on the top thereof.

In the practical operation of my improved device, when the lever 14 is in the position shown in Fig. 1, the spring strips 23 are under very slight compression and may be inserted in a cylindrical passage. After being thus inserted, the toggle lever 14 is pushed upwardly so as to compress the spring 18, assert downward pressure upon the members 19 and 21 and correspondingly place the springs 23 under greater pressure, extending them outwardly and permitting them to accommodate themselves to the bore of the cylinder passage, as plainly shown in Fig. 2. It is possible to do away with the toggle lever and maintain the springs 23 and the casing 29 under constant compression and distortion, but in some instances, at least, the edge 32 of the cylindrical passage 33 will tend to cut the surface of the casing 29, when the same is forced into the passage so that I have found it advisable, for certain uses, to provide means for elongating the springs and casing until they are disposed within the passageway and then permit them to flare into engagement with the walls of the passage. With the springs in the position shown in Fig. 2, the assembly may be rotated through the shaft 5, and the material of the member 29 will impart a high polish to the cylinder passage or bore.

It will be noted that the spring 18 offers resiliency in both positions of the lever 14 and also tends to keep the springs 23 under slight compression at all times so that when the pressure is asserted upon them, they will not collapse inwardly instead of flaring outwardly. It will be further noted that the bands 30 and 31 which secure the casing 29 in place may permit slippage of the casing that it may flare to engage with the surface of the passageway into which it is inserted.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a power driven shaft, a plurality of spring strips disposed around a portion of the shaft, means fixed on said shaft engaging one end of said strips, means movable on said shaft for engaging the other end thereof, and means for moving said latter engaging means on the shaft, said means including a toggle mechanism having the end of one link engaging said latter engaging means and the end of another link engaging said shaft.

2. In combination, a power driven shaft, a plurality of spring strips disposed around a portion of the shaft, means fixed on said shaft engaging one end of said strips, means movable on said shaft for engaging the other end thereof, means for moving said latter engaging means on the shaft, said means including a toggle mechanism having the end of one link engaging said latter engaging means and the end of another link engaging said shaft, and means for locking the toggle links in one position.

3. In combination, a power driven shaft, a plurality of resilient strips having one of their ends fixed with respect to said shaft, a covering for said strips, and means slideable on said shaft for resiliently positioning the opposite ends of said strips axially with respect to said shaft.

CHARLES H. FENNELL.